United States Patent
Huang (10) Patent No.: US 11,648,466 B2
(45) Date of Patent: May 16, 2023

(54) DATA TRANSMISSION METHOD AND RELATED APPARATUS

(71) Applicant: GUANGDONG OPPO MOBILE TELECOMMUNICATIONS CORP., LTD., Guangdong (CN)

(72) Inventor: Yuan Huang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 67 days.

(21) Appl. No.: 17/370,804

(22) Filed: Jul. 8, 2021

(65) Prior Publication Data

US 2021/0331067 A1 Oct. 28, 2021

Related U.S. Application Data

(63) Continuation of application No. PCT/CN2020/070965, filed on Jan. 8, 2020.

(30) Foreign Application Priority Data

Jan. 11, 2019 (CN) .................. 201910028202.X (51) Int. Cl.
*A63F 13/327* (2014.01)
*H04W 28/08* (2023.01)

(52) U.S. Cl.
CPC ......... *A63F 13/327* (2014.09); *H04W 28/085* (2013.01); *A63F 2300/405* (2013.01)

(58) Field of Classification Search
None
See application file for complete search history.

(56) References Cited

U.S. PATENT DOCUMENTS

| 9,985,867 B2 | 5/2018 | Dong et al. |
| 2006/0084507 A1* | 4/2006 | Miyazaki ............... A63F 13/48 463/43 |
| 2010/0085916 A1 | 4/2010 | Yu et al. |

(Continued)

FOREIGN PATENT DOCUMENTS

| CN | 101626596 A | 1/2010 |
| CN | 105208624 A | 12/2015 |

(Continued)

OTHER PUBLICATIONS

Extended European Search Report for EP Application 20738757.2 dated Jan. 25, 2022. (11 pages).

(Continued)

*Primary Examiner* — Damon J Pierce
(74) *Attorney, Agent, or Firm* — Young Basile Hanlon & MacFarlane, P.C.

(57) ABSTRACT

Provided are a data transmission method and related apparatuses. The method is applicable to an electronic device established with a plurality of wireless communication links and includes the following. A game running scene is detected. in response to a game application running in a foreground. A scene data packet of the game running scene is acquired. At least two target wireless communication links are selected from the plurality of wireless communication links based on the game running scene and performing shunt transmission on the scene data packet.

15 Claims, 4 Drawing Sheets

(56) References Cited

U.S. PATENT DOCUMENTS

2010/0278158 A1\* 11/2010 Lee ................ H04W 48/20
                                                       370/338
2017/0214626 A1   7/2017 Dunlap et al.

FOREIGN PATENT DOCUMENTS

| CN | 106851738 A | 6/2017 |
|---|---|---|
| CN | 107067475 A | 8/2017 |
| CN | 107517482 A | 12/2017 |
| CN | 107734556 A | 2/2018 |
| CN | 108881012 A | 11/2018 |
| CN | 108924872 A | 11/2018 |
| CN | 109495880 A | 3/2019 |
| CN | 109618372 A | 4/2019 |
| WO | 2017185381 A1 | 11/2017 |

OTHER PUBLICATIONS

International Search Report with English Translation for PCT Application PCT/CN2020/070965 dated Mar. 26, 2020. (24 pages).
Chinese Office Action with English Translation for CN Application 201910028202.X dated Jul. 28, 2020.
Chinese Notice of Allowance with English Translation for CN Application 201910028202.X dated Jul. 28, 2020. (8 pages).

\* cited by examiner

DATA TRANSMISSION METHOD AND RELATED APPARATUS

CROSS-REFERENCE TO RELATED APPLICATION(S)

This is a continuation application of International Application No. PCT/CN2020/070965 filed on Jan. 8, 2020, which is based upon and claims priority to Chinese Patent Application No. 201910028202.X filed on Jan. 11, 2019, the entire contents of both of which are incorporated herein by reference.

TECHNICAL FIELD

The disclosure relates to the field of electronic device technologies, and specifically to a data transmission method and related apparatuses.

BACKGROUND

Requirements of users on data communication are increasingly large with the development of mobile communication technologies. At present, when an intelligent terminal on the market performs data transmission, it generally transmits data through cellular mobile network communication or Wi-Fi (wireless fidelity) communication and thus needs to compete wireless link resources with other devices in the same region, which is difficult to satisfy network requirements of users.

SUMMARY

In a first aspect, embodiments of the disclosure provide a data transmission method, which is applicable to an electronic device established with a plurality of wireless communication links. The method includes the following.

A game running scene is detected. in response to a game application running in a foreground.

A scene data packet of the game running scene is acquired.

At least two target wireless communication links are selected from the plurality of wireless communication links based on the game running scene and shunt transmission is performed on the scene data packet.

In a second aspect, embodiments of the disclosure provide an electronic device. The device includes a processor, a memory, a communication interface, and one or more programs, in which the one or more programs are stored in the memory and configured to be executed by the processor, and the programs include instructions configured to execute actions in any method in the first aspect of embodiments of the disclosure.

In a third aspect, embodiments of the disclosure provide a computer-readable storage medium, in which the computer-readable storage medium stores a computer program configured to exchange electronic data, and the computer program causes a computer to execute part or all of actions in any method in the first aspect of embodiments of the disclosure.

BRIEF DESCRIPTION OF DRAWINGS

The following is a brief introduction of the drawings related in embodiments of the disclosure.

DETAILED DESCRIPTION

In order to make those skilled in the art better understand solutions of the disclosure, technical solutions in embodiments of the disclosure will be described clearly and completely with reference to the drawings in embodiments of the disclosure. It is obvious that the embodiments described herein are only part of embodiments in the disclosure, rather than the whole embodiments. On the basis of embodiments of the disclosure, all other embodiments acquired by those skilled in the art without creative work are within the scope of the disclosure.

The terms "first", "second" and the like in the description and the claims of the disclosure and the drawings are used for distinguishing different objects, rather than describing a specific order. In addition, the terms "include/comprise", "have", and their any variations are intended to cover non-exclusive inclusions. For example, a process, method, system, product, or apparatus that includes a series of actions or units is not limited to the listed actions or units, but may optionally further include actions or units not listed, or may optionally further include other actions or units inherent to such process, method, product, or apparatus.

Reference herein to "embodiments" means that a particular feature, structure, or characteristic described in connection with the embodiments may be included in at least one embodiment of the disclosure. The appearances of this phrase in various places of the specification are not necessarily all referring to the same embodiments, nor are separate or alternative embodiments mutually exclusive of other embodiments. Those skilled in the art may understand explicitly and implicitly that the embodiments described herein may be combined with other embodiments.

The electronic device related in the embodiments of the disclosure may be an electronic device with a data transmission ability, which may include all kinds of handheld devices, vehicle-mounted devices, wearable devices, computing devices, with wireless communication functions, or other processing devices connected to wireless modems, as well as various forms of user equipment (UE), mobile stations (MS), terminal devices, etc.

The embodiments of the disclosure are introduced in detail below.

Figure 1:
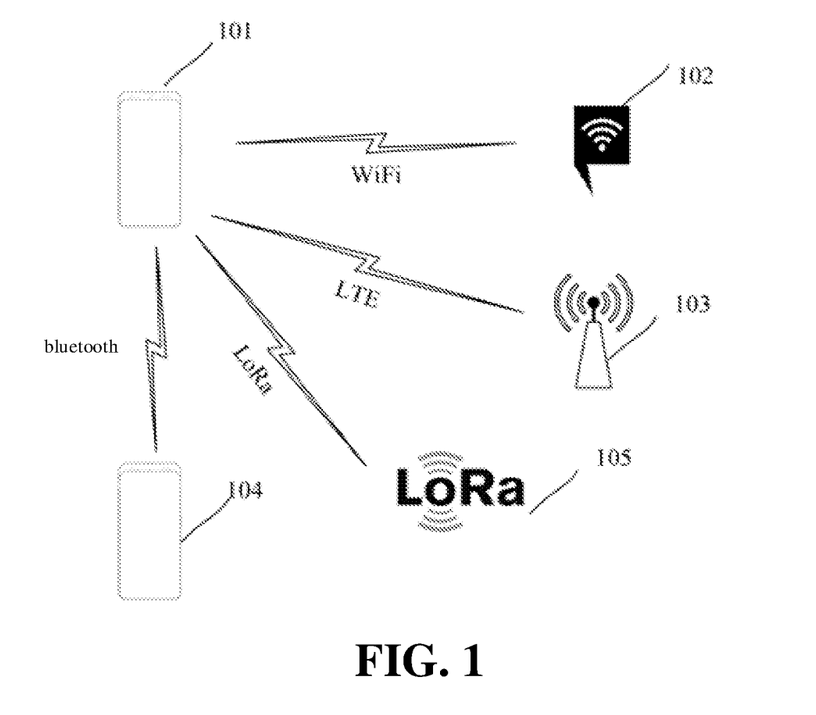
FIG. 1 is an example schematic diagram illustrating a system architecture of a wireless communication system located by an electronic device provided in some embodiments of the disclosure.

Link aggregation means that a device may simultaneously use two or more network ports to simultaneously surf the Internet, such as it may make network access by using simultaneously a Wi-Fi and a data network through link aggregation on a mobile phone. When the Wi-Fi is enabled, the android network system may cause the data network to be not available (ConnectivityService, a network scoring mechanism causes the data network to be disconnected), while the link aggregation requires at least two or more available networks. Therefore, the precondition of a Service-Level Agreement (SLA) is to coexist the Wi-Fi and data networks. As illustrated in FIG. 1, the electronic device 101 may be connected to: a data network 103, in which the data network is a communication network configured to transmit data services; a Wi-Fi 102, in which the Wi-Fi is a technology that allows the electronic device to be connected to a wireless local area network (WLAN) and employs generally a frequency band of 2.4G UHF (Ultra High Frequency) or 5G SHF (Super High Frequency) ISM (Industrial Scientific Medical); a Bluetooth communication 104, which is a wireless technology standard and may achieve short-distance network sharing and data exchange among fixed devices, mobile devices, and building personal domain networks (with the UHF radio wave of 2.4-2.485 GHz ISM band); and a LORA (Long Range Radio) communication module, which is a long-distance wireless transmission technology based on a spread spectrum technology.

Figure 2:
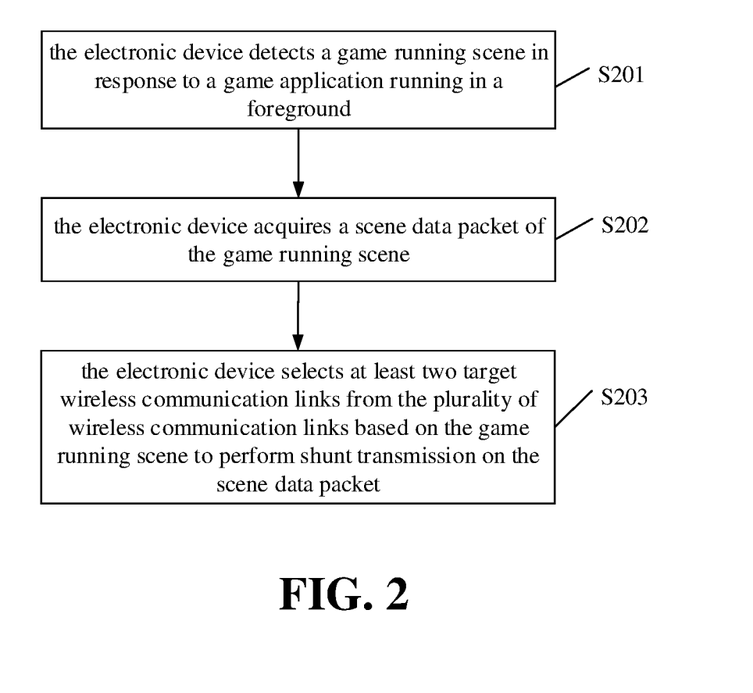
FIG. 2 is a flowchart illustrating a data transmission method provided in some embodiments of the disclosure.

Referring to FIG. 2, FIG. 2 is a flowchart of a data transmission method provided in some embodiments of the disclosure, which is applicable to the electronic device illustrated in FIG. 1. The electronic device may be established with a plurality of wireless communication links. The data transmission method includes the following as illustrated in FIG. 2.

At S201, the electronic device detects a game running scene in response to a game application running in a foreground.

Before the electronic device detects the game running scene in response to the game application running in the foreground, the method further includes: when detecting an enable request for a link aggregation function, enabling the link aggregation function.

The game running scenes may be various, which may include one game running scene or include various game running scenes simultaneously, such as a team fight running scene, a relatively static running scene, a fast moving running scene, which is not limited herein.

The team fight running scene refers to a running scene where a plurality of users may participate in the game at the same time, and a screen of the electronic device may display the scene of the plurality of users playing the game in the same screen. The relatively static running scene refers to a scene where a game character of an account corresponding to the electronic device is in a relatively static state. The fast moving running scene refers to a scene where a game character of an account corresponding to the electronic device is in a fast moving state. The implementation manners of detecting the game running scene by the electronic device may be various, for example, a number of characters in a current game interface may be detected, or a moving speed of a character in a current game interface may also be detected, which is not limited herein.

At S202, the electronic device acquires a scene data packet of the game running scene.

The scene data packet includes a data packet of associated information that needs to be transmitted in the game running scene while the game application is running, which may include at least one of the following information: screen data of the game running scene, speech data of the game running scene, fight data of the game running scene, character data of the game running scene, etc.

At S203, the electronic device selects at least two target wireless communication links from the plurality of wireless communication links based on the game running scene to perform shunt transmission on the scene data packet.

In the implementation, the electronic device may split the scene data packet and data packets in addition to the scene data packet, to perform the shunt transmission on the scene data packet through the enabled at least two wireless communication links. For example, the data packets may be marked with different mark values, to query different routing tables by matching different mark values, so that the data packets may access the network from different interfaces, that is, from different wireless communication links.

The data packets in addition to the scene data packet may be data packets of a background application, for example, data packets of a positioning system, which are not limited herein.

Different game running scenes may correspond to different the at least two target wireless communication links. The at least two target wireless communication links may be selected based on the type of the game scene. Or a mapping relationship between different running scenes and different the at least two target wireless communication links may be configured, and the at least two target wireless communication links may be selected from the plurality of wireless communication links based on the game running scene to perform the shunt transmission on the scene data packet, which is not limited herein.

The implementation manners of selecting by the electronic device the at least two target wireless communication links from the plurality of wireless communication links based on the game running scene to perform the shunt transmission on the scene data packet may be various. For example, the scene data packet may be split into a plurality of data groups, each data group is transmitted over the different wireless communication link, and the data packets other than the scene data packet are transmitted over the wireless communication link(s) not used for the plurality of data groups. Or the scene data packet may also be transmitted over two wireless communication links with the best network state parameters, and the data packets other than the scene data packet are transmitted over one of the two wireless communication links, which is not limited herein.

The data packets in addition to the scene data packet may be data packets constantly running on the background, for example, data packets corresponding to a positioning module, which are not limited herein.

As may be seen, in embodiments of the disclosure, the electronic device detects the game running scene in response to the game application running in the foreground, acquires the scene data packet of the game running scene, and selects the at least two target wireless communication links from the plurality of wireless communication links based on the game running scene to perform the shunt transmission on the scene data packet. It may be seen that, the electronic device may select different the at least two target wireless communication links to perform the shunt transmission on the scene data packet based on different game running scenes during the running process of the game application, which may implement the shunt transmission function of the data packet over the plurality of wireless communication links and improve the rationality of selecting links. Compared with the conventional data transmission method, the data transmission speed may be enhanced, the data transmission consumption duration may be reduced, and the network delay may be reduced, so as to improve the data transmission efficiency of the electronic device.

In a possible example, selecting the at least two target wireless communication links from the plurality of wireless communication links based on the game running scene to perform the shunt transmission on the scene data packet includes the following.

A scene type included in the game running scene is determined.

The at least two target wireless communication links matching the scene type are selected from the plurality of wireless communication links based on the scene type.

The shunt transmission is performed on the scene data packet through the at least two target wireless communication links.

The implementation manners of determining by the electronic device the scene type included in the game running scene may be various. For example, it may be determined based on the current game interface, or identification information may be configured when the game runs, and the electronic device may determine different game running scenes based on the identification information, which is not limited herein.

The implementation manners of selecting the at least two target wireless communication links matching the scene type from the plurality of wireless communication links based on the scene type may be various. For example, a priority order of wireless communication links corresponding to the scene type may be preset in the electronic device, and the electronic device may sort the plurality of wireless communication links first, determine the priority order of the wireless communication links based on the scene type, and then select wireless communication links based on the sorted result. Or different scenes may correspond to a plurality of different wireless communication links, and the electronic device may select target wireless communication links from the plurality of wireless communication links based on a data amount of the data packet corresponding to the scene type, which is not limited herein.

For example, when the scene type includes a relatively static scene and a fast moving scene, at least one target wireless communication link with a slower data transmission speed or a poor channel quality may be selected based on the relatively static scene, and at least one target wireless communication link with a faster data transmission speed or a good channel quality may be selected based on the fast moving scene, and then the scene data packet corresponding to the two types of scenes are transmitted through the two target wireless communication links respectively.

It may be seen that, in the example, the electronic device selects target wireless communication links based on the scene type included in the game running scene, thereby performing the shunt transmission on the scene data packet, which is beneficial to improving the rationality of selecting wireless communication links, and balancing the utilization rate of the wireless communication links when ensuring the data transmission speed.

In a possible example, the scene type includes a first scene type and a second scene type, and selecting the at least two target wireless communication links matching the scene type from the plurality of wireless communication links based on the scene type, includes the following.

A first data amount corresponding to the first scene type is determined, and a second data amount corresponding to the second scene type is determined.

At least one first target wireless communication link is selected from the plurality of wireless communication links based on the first data amount, and at least one second target wireless communication link is selected from the plurality of wireless communication links based on the second data amount, in which the first target wireless communication link is different from the second target wireless communication link.

The larger the data amount is, the better the channel quality of the target wireless communication link selected is, and the smaller the data amount is, the worse the channel quality of the target wireless communication link selected is.

It may be seen that, in the example, the electronic device selects the wireless communication links based on data amounts of different scene types, which helps avoid waste of the high-quality wireless communication link, improve the transmission speed of the data packet with the high data amount and enhance the efficiency of data transmission.

In a possible example, the scene type includes a third scene type, and selecting the at least two target wireless communication links from the plurality of wireless communication links based on the scene type includes the following.

A number of wireless communication links for performing the shunt transmission on the scene data packet is determined based on a number of people in a third scene corresponding to the third scene type.

Target wireless communication links matching the number of wireless communication links are selected from the plurality of wireless communication links.

The third scene type may be, for example, a team fight running scene. The characteristic of the team fight running scene may be a large number of people participating in fight during the game running process. Therefore, the implementation manners of determining by the electronic device the number of wireless communication links for performing the shunt transmission on the scene data packet based on the number of people in the third scene corresponding to the third scene type may be various, for example, the electronic device may store in advance a mapping relationship between the number of people and the number of wireless communication links to be enabled, query the mapping relationship based on the number of people, and determine the number of corresponding wireless communication links, or the electronic device may determine a numerical interval of the number of people first, and determine the number of the corresponding wireless communication links based on the numerical interval, which are not limited herein.

The target wireless communication links may be target wireless communication links matching the number of wireless communication links, which may be determined by acquiring network state parameters of the electronic device from the plurality of wireless communication links, or may be target wireless communication links matching the number of wireless communication links, which may be determined based on the type of the game application from the plurality of wireless communication links. The type of the game application may be, for example, a stand-alone game, or a network game, in which the stand-alone game may be played over a local area network, and the network game needs to be played over the Internet, which are not limited herein.

The network state parameters of the electronic device refer to parameters such as a detected network speed used by each wireless communication module of the detection device, for example, a ZigBee module, a Wi-Fi module, a Bluetooth module, etc. The implementation manners of determining the target wireless communication links matching the number of wireless communication links from the plurality of wireless communication links based on the network state parameters may be as follows: comparing network state parameters of each module, preferentially enabling a wireless communication module to transmit data, for example, when the network quality of a Wi-Fi is poor, it is compensated by an LTE (Long Term Evolution) network; the electronic device directly enabling the target wireless communication links matching the number of wireless communication links in the plurality of wireless communication links.

In the example, the electronic device determines the number of wireless communication links to be enabled based on the number of people, and transmits the scene data packet based on the target wireless communication links matching the number of wireless communication links, which is beneficial to enhancing the rationality and accuracy of transmitting based on wireless communication links.

In a possible example, performing the shunt transmission on the scene data packet through the at least two target wireless communication links, includes the following.

The scene data packet is split to acquire a plurality of data groups.

A correspondence between each of the plurality of data groups after splitting and the at least two target wireless communication links is established.

The shunt transmission is performed on the plurality of data groups based on the correspondence through the at least two target wireless communication links.

The implementation manners of splitting the scene data packet to acquire a plurality of data groups may be splitting the scene data packet based on different data types in the scene data packet, or may evenly distributing the data in the scene data packet into a plurality of data groups based on the data amount, which is not limited herein.

The plurality of data groups means that the number of data groups and a data amount of each data group have been determined, in which, one wireless communication link may correspond to data groups or may correspond to one data group, which is not limited herein.

The implementation manners of establishing a correspondence between each of the plurality of data groups after splitting and the at least two target wireless communication links may be determining a corresponding target wireless communication link based on the data type of each data group in the data groups, or may be determining a corresponding target wireless communication link based on the data amount of the data group, which is not limited herein.

In the example, the electronic device splits the scene data packet, and select different target communication links for transmission for different data groups, which reduces the data transmission amount of each target wireless communication link and improves the data transmission speed and the transmission pertinence of each target wireless communication link.

In a possible example, establishing the correspondence between each of the plurality of data groups after splitting and the at least two target wireless communication links, includes the following.

A type of each of the plurality of data groups is determined.

A correspondence between each of the plurality of data groups after splitting and each of the at least two target wireless communication links is determined based on the type of each of the plurality of data groups and a channel quality of each of the at least two target wireless communication links.

The electronic device may store in advance a priority relationship corresponding to types of the data groups, and allocate target wireless communication links based on the channel qualities through the priority relationship, in which a wireless communication link with a high quality channel may be allocated to data with a high priority, and a wireless communication link with a low quality channel may be allocated to data with a low priority. For example, the priority of the audio data group is lower than the priority of the image data group. Therefore, the channel quality of the wireless communication link allocated to the audio data is lower than that of the wireless communication link allocated to the image data.

As may be seen, in the example, the electronic device determines the wireless communication link corresponding to each data group based on the type of each data group and the channel quality of each data group, which is beneficial to improving the rationality of transmitting each data group and improving the overall speed of the data transmission.

In a possible example, splitting the scene data packet to acquire the plurality of data groups, includes the following.

The scene data packet is split based on a scene type included in the scene data packet.

The plurality of data groups after splitting the scene data packet are acquired, in which a scene corresponding to data in each of the plurality of data packets is different.

The implementation manners of splitting the scene data packet based on a scene type included in the scene data packet may be various, for example, may be splitting based on the running environment of the scene type. For example, the scene type is a game running scene within a LAN, and the scene data may be split based on the audio data type and the image data type, in which, the audio data type may be transmitted through the Bluetooth module or the ZigBee module without occupying the data network resources, and the image data may be transmitted through the LTE data network, to improve the transmission speed of the image data. Or when a plurality of characters are included in the scene data packet, for example, a team fight running scene, the scene data packet may be split based on the game environment data and the game character data, which is not limited herein.

It may be seen that in the example, the electronic device groups the data packet in the game running scene based on the data type, which is beneficial to improving the rationality of data grouping.

Figure 3:
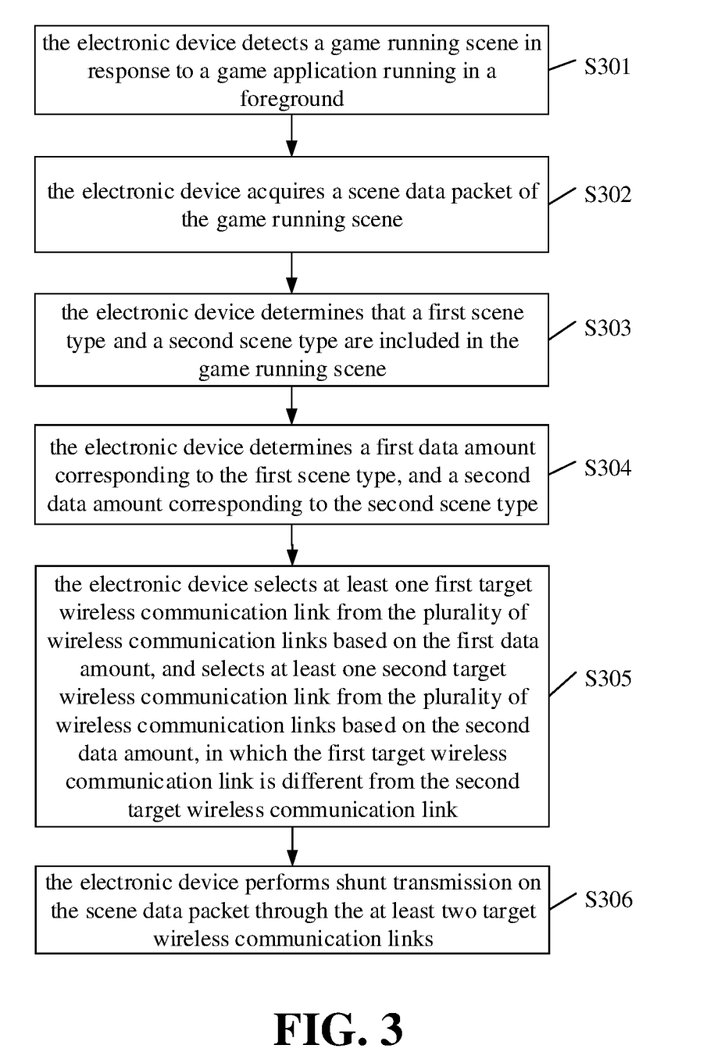
FIG. 3 is a flowchart illustrating another data transmission method provided in some embodiments of the disclosure.

In accordance with the embodiments as illustrated in FIG. 2, referring to FIG. 3, FIG. 3 is a flowchart illustrating a data transmission method provided in some embodiments of the disclosure, which is applicable to the electronic device illustrated in FIG. 1. The electronic device may be established with a plurality of wireless communication links. The data transmission method includes the following as illustrated in FIG. 3.

At S301, the electronic device detects a game running scene in response to a game application running in a foreground.

At S302, the electronic device acquires a scene data packet of the game running scene.

At S303, the electronic device determines that a first scene type and a second scene type are included in the game running scene.

At S304, the electronic device determines a first data amount corresponding to the first scene type, and a second data amount corresponding to the second scene type.

At S305, the electronic device selects at least one first target wireless communication link from the plurality of wireless communication links based on the first data amount, and selects at least one second target wireless communication link from the plurality of wireless communication links based on the second data amount, in which the first target wireless communication link is different from the second target wireless communication link.

At S306, the electronic device performs shunt transmission on the scene data packet through the at least two target wireless communication links.

As may be seen, in the embodiments of the disclosure, the electronic device detects the game running scene in response to the game application running in the foreground, acquires the scene data packet of the game running scene, and selects the at least two target wireless communication links from the plurality of wireless communication links based on the game running scene to perform the shunt transmission on the scene data packet. It may be seen that, the electronic device may select different the at least two target wireless communication links to perform the shunt transmission on the scene data packet based on different game running scenes during the running process of the game application, which may implement the shunt transmission function of the data packet over the plurality of wireless communication links and improve the rationality of selecting links. Compared with the conventional data transmission method, the data transmission speed may be enhanced, the data transmission consumption duration may be reduced, and the network delay may be reduced, so as to improve the data transmission efficiency of the electronic device.

In addition, the electronic device selects target wireless communication links based on the scene type included in the game running scene, thereby performing the shunt transmission on the scene data packet, which is beneficial to improving the rationality of selecting wireless communication links, and balancing the utilization rate of the wireless communication links when ensuring the data transmission speed.

In addition, the electronic device selects the wireless communication links based on data amounts of different scene types, which helps avoid waste of the high-quality wireless communication link, improve the transmission speed of the data packet with the high data amount and enhance the efficiency of data transmission.

Figure 4:
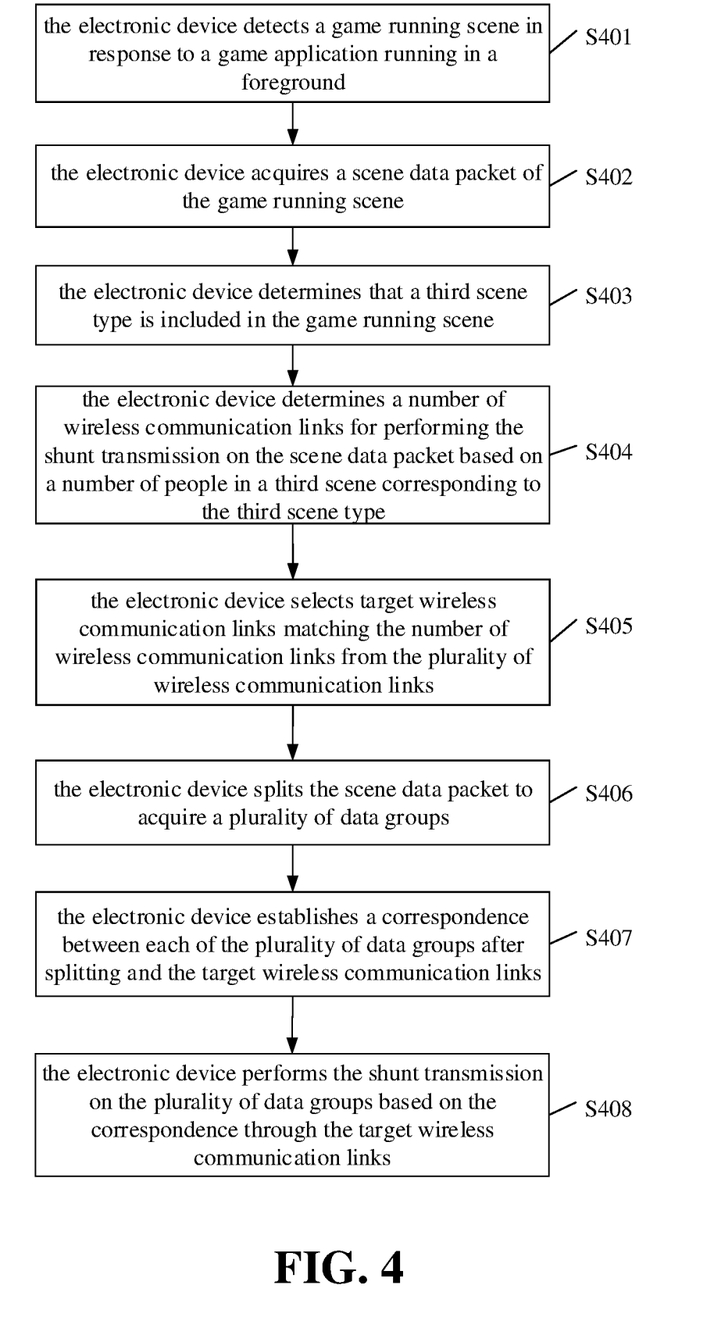
FIG. 4 is a flowchart illustrating another data transmission method provided in some embodiments of the disclosure.

In accordance with the embodiments as illustrated in FIG. 2, referring to FIG. 4, FIG. 4 is a flowchart illustrating a data transmission method provided in some embodiments of the disclosure, which is applicable to the electronic device illustrated in FIG. 1. The electronic device may be established with a plurality of wireless communication links. The data transmission method includes the following as illustrated in FIG. 4.

At S401, the electronic device detects a game running scene in response to a game application running in a foreground.

At S402, the electronic device acquires a scene data packet of the game running scene.

At S403, the electronic device determines that a third scene type is included in the game running scene.

At S404, the electronic device determines a number of wireless communication links for performing the shunt transmission on the scene data packet based on a number of people in a third scene corresponding to the third scene type.

At S405, the electronic device selects target wireless communication links matching the number of wireless communication links from the plurality of wireless communication links.

At S406, the electronic device splits the scene data packet to acquire a plurality of data groups.

At S407, the electronic device establishes a correspondence between each of the plurality of data groups after splitting and the target wireless communication links.

At S408, the electronic device performs the shunt transmission on the plurality of data groups based on the correspondence through the target wireless communication links.

As may be seen, in the embodiments of the disclosure, the electronic device detects the game running scene in response to the game application running in the foreground, acquires the scene data packet of the game running scene, and selects the at least two target wireless communication links from the plurality of wireless communication links based on the game running scene to perform the shunt transmission on the scene data packet. It may be seen that, the electronic device may select different the at least two target wireless communication links to perform the shunt transmission on the scene data packet based on different game running scenes during the running process of the game application, which may implement the shunt transmission function of the data packet over the plurality of wireless communication links and improve the rationality of selecting links. Compared with the conventional data transmission method, the data transmission speed may be enhanced, the data transmission consumption duration may be reduced, and the network delay may be reduced, so as to improve the data transmission efficiency of the electronic device.

In addition, the electronic device selects target wireless communication links based on the scene type included in the game running scene, thereby performing the shunt transmission on the scene data packet, which is beneficial to improving the rationality of selecting wireless communication links, and balancing the utilization rate of the wireless communication links when ensuring the data transmission speed.

In addition, the electronic device determines the number of wireless communication links to be enabled based on the number of people, and transmits the scene data packet based on the target wireless communication links matching the number of wireless communication links, which is beneficial to enhancing the rationality and accuracy of transmitting based on wireless communication links.

In addition, the electronic device splits the scene data packet, and select different target communication links for transmission for different data groups, which reduces the data transmission amount of each target wireless communication link and improves the data transmission speed and the transmission pertinence of each target wireless communication link.

Figure 5:
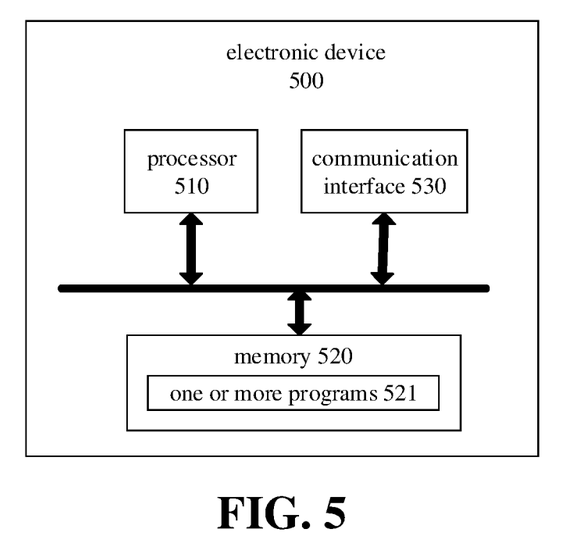
FIG. 5 is a schematic diagram illustrating a structure of an electronic device provided in some embodiments of the disclosure.

Referring to FIG. 5 in accordance with the embodiments as illustrated in FIG. 2, FIG. 3 and FIG. 4, FIG. 5 is a schematic diagram illustrating a structure of an electronic device provided in some embodiments of the disclosure. The electronic device may be established with a plurality of wireless communication links. As illustrated in FIG. 5, the electronic device 500 includes an application processor 510, a memory 520, a communication interface 530, and one or more programs 521, in which the one or more programs 521 are stored in the above memory 520 and configured to be executed by the application processor 510. The one or more programs 521 include the instructions configured to execute the following actions.

A game running scene is detected in response to a game application running in a foreground.

A scene data packet of the game running scene is acquired.

At least two target wireless communication links are selected from the plurality of wireless communication links based on the game running scene to perform shunt transmission on the scene data packet.

As may be seen, in the embodiments of the disclosure, the electronic device detects the game running scene in response to the game application running in the foreground, acquires the scene data packet of the game running scene, and selects the at least two target wireless communication links from the plurality of wireless communication links based on the game running scene to perform the shunt transmission on the scene data packet. It may be seen that, the electronic device may select different the at least two target wireless communication links to perform the shunt transmission on the scene data packet based on different game running scenes during the running process of the game application, which may implement the shunt transmission function of the data packet over the plurality of wireless communication links and improve the rationality of selecting links. Compared with the conventional data transmission method, the data transmission speed may be enhanced, the data transmission consumption duration may be reduced, and the network delay may be reduced, so as to improve the data transmission efficiency of the electronic device.

In a possible example, in selecting the at least two target wireless communication links from the plurality of wireless communication links based on the game running scene to perform the shunt transmission on the scene data packet, the instructions in the program 521 are specifically configured to: determine a scene type comprised in the game running scene; select the at least two target wireless communication links matching the scene type from the plurality of wireless communication links based on the scene type; and perform the shunt transmission on the scene data packet through the at least two target wireless communication links.

In a possible example, the scene type includes a first scene type and a second scene type, in selecting the at least two target wireless communication links matching the scene type from the plurality of wireless communication links based on the scene type, the instructions in the program 521 are configured to: determine a first data amount corresponding to the first scene type, and a second data amount corresponding to the second scene type; and select at least one first target wireless communication link from the plurality of wireless communication links based on the first data amount, and select at least one second target wireless communication link from the plurality of wireless communication links based on the second data amount, the first target wireless communication link being different from the second target wireless communication link.

In a possible example, the scene type includes a third scene type, in selecting the at least two target wireless communication links from the plurality of wireless communication links based on the scene type, the instructions in the program 521 are configured to: determine a number of wireless communication links for performing the shunt transmission on the scene data packet based on a number of people in a third scene corresponding to the third scene type; and select target wireless communication links matching the number of wireless communication links from the plurality of wireless communication links.

In a possible example, in performing the shunt transmission on the scene data packet through the at least two target wireless communication links, the instructions in the program 521 are specifically configured to: split the scene data packet to acquire a plurality of data groups; establish a correspondence between each of the plurality of data groups after splitting and the at least two target wireless communication links; and perform the shunt transmission on the plurality of data groups based on the correspondence through the at least two target wireless communication links.

In a possible example, in establishing the correspondence between each of the plurality of data groups after splitting and the at least two target wireless communication links, the instructions in the program 521 are configured to: determine a type of each of the plurality of data groups; and establish a correspondence between each of the plurality of data groups after splitting and each of the at least two target wireless communication links based on the type of each of the plurality of data groups and a channel quality of each of the at least two target wireless communication links.

In a possible example, in splitting the scene data packet to acquire the plurality of data groups, the instructions in the program 521 are specifically configured to: split the scene data packet based on a scene type comprised in the scene data packet; and acquire the plurality of data groups after splitting the scene data packet, a scene type corresponding to data in each of the plurality of data packets being different.

The solutions of the embodiments of the disclosure is introduced from the perspective of execution process at method side. It could be understood that, the electronic device includes hardware structures and/or software modules that execute various functions in order to implement the above functions. Those skilled in the related art should be easily aware that, in combination with the units and algorithm actions of the examples described in embodiments of the disclosure, the disclosure may be implemented in the form of hardware or a combination of hardware and computer software. Whether a function is executed by hardware or computer software driven by hardware depends on the specific application and design constraints of the technical solution. Those skilled in the art may adopt different methods for each specific application to implement the described functions, but such implementation should not be considered beyond the scope of the disclosure.

Embodiments of the disclosure may divide the functional units of the electronic device according to the above method examples, for example, various functional units may be divided corresponding to various functions, and two or more functions may be integrated in one processing unit. The above integrated unit may be implemented in the form of hardware or in the form of software functional unit. It should be noted that, the division of units in embodiments of the disclosure is illustrative, only a logical function division. There may be another division method in the actual implementation.

Figure 6:
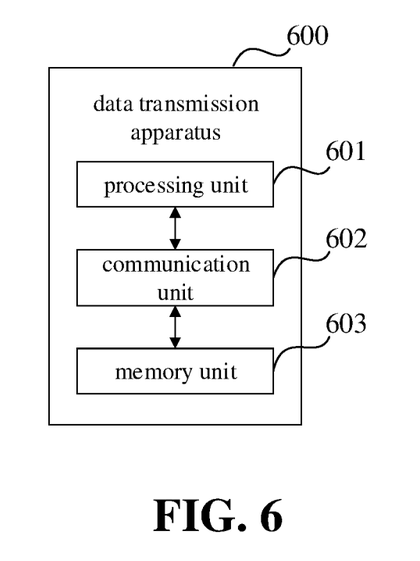
FIG. 6 is a block diagram illustrating functional units of a data transmission apparatus provided in some embodiments of the disclosure.

FIG. 6 is a block diagram illustrating functional units of a data transmission apparatus 600 provided in some embodiments of the disclosure. The data transmission apparatus 600 is applicable to an electronic device established with a plurality of wireless communication links, and the apparatus 600 includes a processing unit 601 and a communication unit 602.

The processing unit 601 is configured to detect a game running scene in response to a game application running in a foreground; acquire a scene data packet of the game running scene; and select at least two target wireless communication links from the plurality of wireless communication links based on the game running scene to perform shunt transmission on the scene data packet through the communication unit 602.

The data transmission apparatus 600 may further include a memory unit 603, which is configured to store program codes and data of the electronic device. The processing unit 601 may be a processor, and the communication unit 602 may be a touch display screen or a transceiver, and the memory unit 603 may be a memory.

As may be seen, in the embodiments of the disclosure, the electronic device detects the game running scene in response to the game application running in the foreground, acquires the scene data packet of the game running scene, and selects the at least two target wireless communication links from the plurality of wireless communication links based on the game running scene to perform the shunt transmission on the scene data packet. It may be seen that, the electronic device may select different the at least two target wireless communication links to perform the shunt transmission on the scene data packet based on different game running scenes during the running process of the game application, which may implement the shunt transmission function of the data packet over the plurality of wireless communication links and improve the rationality of selecting links. Compared with the conventional data transmission method, the data transmission speed may be enhanced, the data transmission consumption duration may be reduced, and the network delay may be reduced, so as to improve the data transmission efficiency of the electronic device.

In a possible example, in selecting the at least two target wireless communication links from the plurality of wireless communication links based on the game running scene to perform the shunt transmission on the scene data packet through the communication unit 602, the processing unit 601 is specifically configured to: determine a scene type comprised in the game running scene; and select the at least two target wireless communication links matching the scene type from the plurality of wireless communication links based on the scene type; and perform the shunt transmission on the scene data packet through the at least two target wireless communication links and the communication unit 602.

In a possible example, the scene type includes a first scene type and a second scene type, in selecting the at least two target wireless communication links matching the scene type from the plurality of wireless communication links based on the scene type, the processing unit 601 is specifically configured to: determine a first data amount corresponding to the first scene type, and a second data amount corresponding to the second scene type; and select at least one first target wireless communication link from the plurality of wireless communication links based on the first data amount, and select at least one second target wireless communication link from the plurality of wireless communication links based on the second data amount, the first target wireless communication link being different from the second target wireless communication link.

In a possible example, the scene type includes a third scene type, in selecting the at least two target wireless communication links from the plurality of wireless communication links based on the scene type, the processing unit 601 is configured to: determine a number of wireless communication links for performing the shunt transmission on the scene data packet based on a number of people in a third scene corresponding to the third scene type; and select target wireless communication links matching the number of wireless communication links from the plurality of wireless communication links.

In a possible example, in performing the shunt transmission on the scene data packet through the at least two target wireless communication links and the communication unit 602, the processing unit 601 is specifically configured to: split the scene data packet to acquire a plurality of data groups; and establish a correspondence between each of the plurality of data groups after splitting and the at least two target wireless communication links; and perform the shunt transmission on the plurality of data groups based on the correspondence through the at least two target wireless communication links and the communication unit 602.

In a possible example, in establishing the correspondence between each of the plurality of data groups after splitting and the at least two target wireless communication links, the processing unit 601 is specifically configured to: determine a type of each of the plurality of data groups; and establish a correspondence between each of the plurality of data groups after splitting and each of the at least two target wireless communication links based on the type of each of the plurality of data groups and a channel quality of each of the at least two target wireless communication links.

In a possible example, in splitting the scene data packet to acquire the plurality of data groups, the processing unit 601 is specifically configured to: split the scene data packet based on a scene type comprised in the scene data packet; and acquire the plurality of data groups after splitting the scene data packet, a scene type corresponding to data in each of the plurality of data packets being different.

The embodiments of the disclosure further provide a computer storage medium. The computer storage medium may be configured to store a computer program, and the computer program is configured to cause a computer to execute part or all of actions in any one method recorded in method embodiments, the computer including an electronic device.

The embodiments of the disclosure further provide a computer program product. The computer program product includes a non-transitory computer-readable storage medium storing a computer program, and the computer program may be operable to cause a computer to execute part or all of actions in any one method recorded in method embodiments. The computer program product may be a software installation package, and the computer may include an electronic device.

It should be noted that, for simple description, each foregoing method embodiment is described as a combination of a series of actions. However, those skilled in the art will appreciate that the disclosure is not limited by the order of actions described, because certain actions may be performed in other sequences or simultaneously in accordance with the disclosure. Secondly, those skilled in the art should understand that the embodiments described in the specification are preferred embodiments, and the actions and modules involved are not necessarily required by the disclosure.

In the above embodiments, the descriptions of various embodiments have their own emphasis. For some embodiments that have not been described in detail, reference should be made to related descriptions of other embodiments.

In several embodiments provided by the disclosure, it is to be understood that the disclosed apparatus may be implemented in other ways. For example, the above apparatus embodiments are merely illustrative, such as division of units may be only a logical function division. There may be additional division manners when actual implementation, such as a plurality of units or components may be combined or may be integrated into another system, or some features may be omitted, or not performed. The coupling or direct coupling or communication connection of each other shown or discussed may be an indirect coupling or communication connection through some interfaces, devices, or units, which may be in electrical or other forms.

The units described above as separate parts may or may not be physically separated. The parts shown as units may or may not be physical units, which may be located in one place, or may be distributed to a plurality of network units. Some or all units may be selected according to the actual requirements to achieve the purpose of the disclosure.

In addition, individual functional units in the embodiments of the disclosure may be integrated in one processing unit or may be separately physically present, or two or more units may be integrated in one unit. The above integrated unit may be implemented in the form of a hardware or in the form of a software functional unit.

If the integrated unit is achieved in the form of a software functional unit and sold or used as a separate product, the integrated unit may also be stored in a computer readable storage medium. On the basis of such an understanding, technical solutions of the disclosure essentially, part of contributing to the prior art in the technical solutions, or all or part of the technical solutions may be embodied in the form of a software product, which is stored in a memory, including several instructions configured to cause a computer device (which may be a personal computer, a server or a network device, etc.) to perform all or part of the actions of various embodiments of the disclosure. The forgoing memory includes a USB disk, a read-only memory (ROM), a random access memory (RAM), a mobile hard disk, a magnetic disk or an optical disk, and other media that may store program codes.

Those skilled in the art may understand that all or part of the actions in the above embodiments may be implemented by instructing relevant hardware through a program, and the program may be stored in a computer readable memory which may be a flash disk, a ROM, a RAM, a magnetic disk or an optical disk, etc.

The above are detailed descriptions of embodiments of the disclosure. Specific examples are applied to elaborate principles and implementations of the disclosure. The description of the above embodiments is only configured to help understand the methods and core concepts of the disclosure; at the same time, for those skilled in the art, there may be changes in the specific implementation and application scope according to the concepts of the disclosure. In summary, content of the specification should not be construed as a limitation of the disclosure.

What is claimed is:

1. A method of data transmission, for an electronic device established with a plurality of wireless communication links, comprising:
　　detecting a game running scene in response to a game application running in a foreground
　　acquiring a scene data packet of the game running scene; and
　　selecting at least two target wireless communication links from the plurality of wireless communication links based on the game running scene and performing shunt transmission on the scene data packet, comprising:
　　　　determining a scene type comprised in the game running scene;
　　　　selecting the at least two target wireless communication links matching the scene type from the plurality of wireless communication links based on the scene type and
　　　　performing the shunt transmission on the scene data packet through the at least two target wireless communication links, comprising:
　　　　　　splitting the scene data packet, and acquiring a plurality of data groups;
　　　　　　establishing a correspondence between each of the plurality of data groups after splitting and the at least two target wireless communication links; and
　　　　　　performing the shunt transmission on the plurality of data groups based on the correspondence through the at least two target wireless communication links.

2. The method of claim 1, wherein, selecting the at least two target wireless communication links matching the scene type from the plurality of wireless communication links based on the scene type, comprises:
　　determining priorities of the plurality of wireless communication links corresponding to the scene type; and
　　selecting the at least two target wireless communication links based on the priorities of the plurality of wireless communication links.

3. The method of claim 1, wherein, e scene type comprises a first scene type and a second scene type, and selecting the at least two target wireless communication links matching the scene type from the plurality of wireless communication :links based on the scene type, comprises:
　　determining a first data amount corresponding to the first scene type, and a second data amount corresponding to the second scene type; and
　　selecting at least one first target wireless communication link from the plurality of wireless communication links based on the first data amount, and selecting at least one second target wireless communication link from the plurality of wireless communication links based on the second data amount, the first target wireless communication link being different from the second target wireless communication link.

4. The method of claim 1, wherein, the scene type comprises a third scene type, and selecting the at least two target wireless communication links from the plurality of wireless communication links based on the scene type, comprises:
　　determining a number of wireless communication links for performing the shunt transmission on the scene data packet based on a number of people in a third scene corresponding to the third scene type; and
　　selecting target wireless communication links matching the number of wireless communication links from the plurality of wireless communication links.

5. The method of claim 1, wherein, establishing the correspondence between each of the plurality of data groups after splitting and the at least two target wireless communication links, comprises:
　　determining a type of each of the plurality of data groups; and
　　establishing a correspondence between each of the plurality of data groups after splitting and each of the at least two target wireless communication links based on the type of each of the plurality of data groups and a channel quality of each of the at least two target wireless communication links.

6. The method of claim 1, wherein, splitting the scene data packet and acquiring the plurality of data groups, comprises:
　　splitting the scene data packet based on a scene type comprised in the scene data packet; and
　　acquiring the plurality of data groups after splitting the scene data packet, a scene type corresponding to data in each of the plurality of data packets being different.

7. An electronic device with a plurality of wireless communication links, comprising:
　　a processor,
　　a memory, a communication interface, and one or more programs, wherein the one or more programs are stored in the and comprises instructions configured to cause the processor to perform:

detecting a game running scene in response to a game application running in a foreground;

acquiring a scene data packet of the game running scene; and     selecting at least two target wireless communication links from the plurality of wireless communication links based on the game running scene and performing shunt transmission on the scene data packet, comprising:

determining a scene type comprised in the game running scene;

selecting the at least two target wireless communication links matching the scene type from the plurality of wireless communication links based on the scene type; and         performing the shunt transmission on the scene data packet through the at least two target wireless communication links, comprising:

splitting the scene data packet, and acquiring a plurality of data groups;

establishing a correspondence between each of the plurality of data groups after splitting and the at least two target wireless communication links; and             performing the shunt transmission on the plurality of data groups based on the correspondence through the at least two target wireless communication links.

8. The device of claim 7, wherein, selecting the at least two target wireless communication links matching the scene type from the plurality of wireless communication links based on the scene type, comprises:

determining priorities of the plurality of wireless communication links corresponding to the scene type; and     selecting the at least two target wireless com unication links based on the priorities of the plurality of wireless communication links.

9. The device of claim 7, wherein, the scene type comprises a first scene type and a second scene type, and selecting the at least two target wireless communication links matching the scene type from the plurality of wireless communication links based on the scene type, comprises:

determining a first data amount corresponding to the first scene type, and a second data amount corresponding to the second scene type; and     selecting at least one first target wireless communication link from the plurality of wireless communication links based on the first data amount, and selecting at least one second target wireless communication link from the plurality of wireless communication links based on the second data amount, the first target wireless communication link being different from the second target wireless communication link.

10. The device of claim 7, wherein, the scene type comprises a third scene type, and selecting the at least two target wireless communication links from the plurality of wireless communication links based on the scene type, comprises:

determining a number of wireless communication links for performing the shunt transmission on the scene data packet based on a number of people in a third scene corresponding to the third scene type; and     selecting target wireless communication links matching the number of wireless communication links from the plurality of wireless communication links.

11. The device of claim 7, wherein, establishing the correspondence between each of the plurality of data groups after splitting and the at least two target wireless communication links, comprises:

determining a type of each of the plurality of data groups; and     establishing a correspondence between each of the plurality of data groups after splitting and each of the at, least, two target wireless communication links based on the type of each of the plurality of data groups and a channel quality of each of the at least two target wireless communication links.

12. The device of claim 7, wherein, splitting the scene data packet and acquiring the plurality of data groups, comprises:

splitting the scene data packet based on a scene type comprised in the scene data packet; and     acquiring the plurality of data groups after splitting the scene data packet, a scene type corresponding to data in each of the plurality of data packets being different.

13. A non-transitory computer readable storage medium having stored therein a computer program for exchanging electronic data, wherein the program causes a computer with a plurality of wireless communication links to perform:

detecting a game running scene in response to a game application running in a foreground;

acquiring a scene data packet of the game running scene; and     selecting at least two target wireless communication links from the plurality of wireless communication links based on the game running scene and performing shunt transmission on the scene data packet, comprising:

determining a scene type comprised in the game running scene;

selecting the at least two target wireless communication links matching the scene type from the plurality of wireless communication links based on the scene type; and         performing the shunt transmission on the scene data packet through the at least two target wireless communication links, comprising:

splitting the scene data packet, and acquiring a plurality of data groups;

establishing a correspondence between each of the plurality of data groups after splitting and the at least two target wireless communication links; and             performing the shunt transmission on the plurality of data groups based on the correspondence through the at least two target wireless communication links.

14. The non-transitory computer readable storage medium of claim 13, wherein, the scene type comprises a first scene type and a second scene type, selecting the at least two target wireless communication links matching the scene type from the plurality of wireless communication links based on the scene type, comprises:

determining a first data amount corresponding to the first scene type, and a second data amount corresponding to the second scene type; and     selecting at, least, one first target wireless communication link from the plurality of wireless communication links based on the first data amount, and selecting at least one second target wireless communication link from the plurality of wireless communication links based on the second data amount, the first target wireless communication link being different from the second target wireless communication link.

15. The non-transitory computer readable storage medium of claim 13, wherein, the scene type comprises a third scene type, selecting the at least two target wireless communication links from the plurality of wireless communication ks based on the scene type, comprises:

determining a number of wireless communication links for performing the shunt transmission on the scene data packet based on a number of people in a third scene corresponding to the third scene type; and selecting target wireless communication links matching the number of wireless communication links from the plurality of wireless communication links.

* * * * *